(12) United States Patent
    Wang et al.

(10) Patent No.: US 9,237,431 B2
(45) Date of Patent: Jan. 12, 2016

(54) METHOD AND APPARATUS FOR EXTENDED EMERGENCY SERVICE

(75) Inventors: Xiaomei Wang, Walnut Creek, CA (US); Loc Vo, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 623 days.

(21) Appl. No.: 12/578,316

(22) Filed: Oct. 13, 2009

(65) Prior Publication Data

US 2011/0086607 A1  Apr. 14, 2011

(51) Int. Cl.
*H04W 76/00*  (2009.01)
*H04W 4/22*  (2009.01)
*H04M 3/51*  (2006.01)
*H04M 3/42*  (2006.01)
*H04W 4/12*  (2009.01)

(52) U.S. Cl.
CPC .............. *H04W 4/22* (2013.01); *H04M 3/5116* (2013.01); *H04W 76/007* (2013.01); *H04M 3/42382* (2013.01); *H04M 2207/206* (2013.01); *H04M 2242/04* (2013.01); *H04W 4/12* (2013.01)

(58) Field of Classification Search
USPC .................... 455/521, 456.1–457, 414.1, 466
See application file for complete search history.

(56) References Cited

U.S. PATENT DOCUMENTS

| | | | |
|---|---|---|---|
| 2001/0036174 A1* | 11/2001 | Herring | 370/352 |
| 2002/0078151 A1* | 6/2002 | Wickam et al. | 709/204 |
| 2002/0197977 A1* | 12/2002 | Brooks | 455/404 |
| 2005/0282518 A1* | 12/2005 | D'Evelyn et al. | 455/404.1 |
| 2007/0025541 A1* | 2/2007 | Mohler | 379/220.01 |
| 2007/0206533 A1* | 9/2007 | Wiatrowski et al. | 370/329 |
| 2009/0186596 A1* | 7/2009 | Kaltsukis | 455/404.2 |

* cited by examiner

*Primary Examiner* — Daniel Lai (57) ABSTRACT

An approach is provided for receiving a voice-based emergency call and routing it to a local Public Safety Answering Point (PSAP) along with anchoring information identifying the caller and their location. The PSAP may provide options for the caller to choose to use non-voice-based messaging service concurrent with the voice-based emergency call. If the caller desires and chooses to communicate via non-voice-based messages, then a text messaging application at the PSAP is used to communicate with the caller. The PSAP utilizes the anchoring information obtained from the concurrent voice-based emergency call when communicating with the caller.

13 Claims, 8 Drawing Sheets

METHOD AND APPARATUS FOR EXTENDED EMERGENCY SERVICE

BACKGROUND INFORMATION

Modern telecommunications services, particularly wireless mobile communication devices, are essential public safety tools. During emergencies, these devices are indispensible for contacting the appropriate people or authorities. Traditionally, a person would use a mobile device to call for help when an emergency arises. During an emergency call, the caller identity and caller location (i.e., anchoring information) would be provided to the public safety answering point (PSAP) to assist the emergency handling. However, there are certain circumstances when the mobile device user may not be able to make a voice call (e.g., when the user cannot speak because of injuries, or when the user must hide his or her call for help from an assailant who is still at the scene). Under these circumstances, the person may be forced to use non-voice communications (e.g., text messaging, instant messaging, or electronic mail) because of the inherently "silent" nature of these types of communications. These types of non-voice communications, however, present a unique set of problems for use during emergencies, especially on the lack of anchoring information to the PSAP.

Therefore, there is a need for an approach that enables a user to easily and discretely communicate with emergency call operators using non-voice messages.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred method and apparatus for extending emergency call services to include non-voice messages are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a mobile device, it is contemplated that these embodiments have applicability to any device capable of communicating over a network using voice and non-voice technologies.

Figure 1:
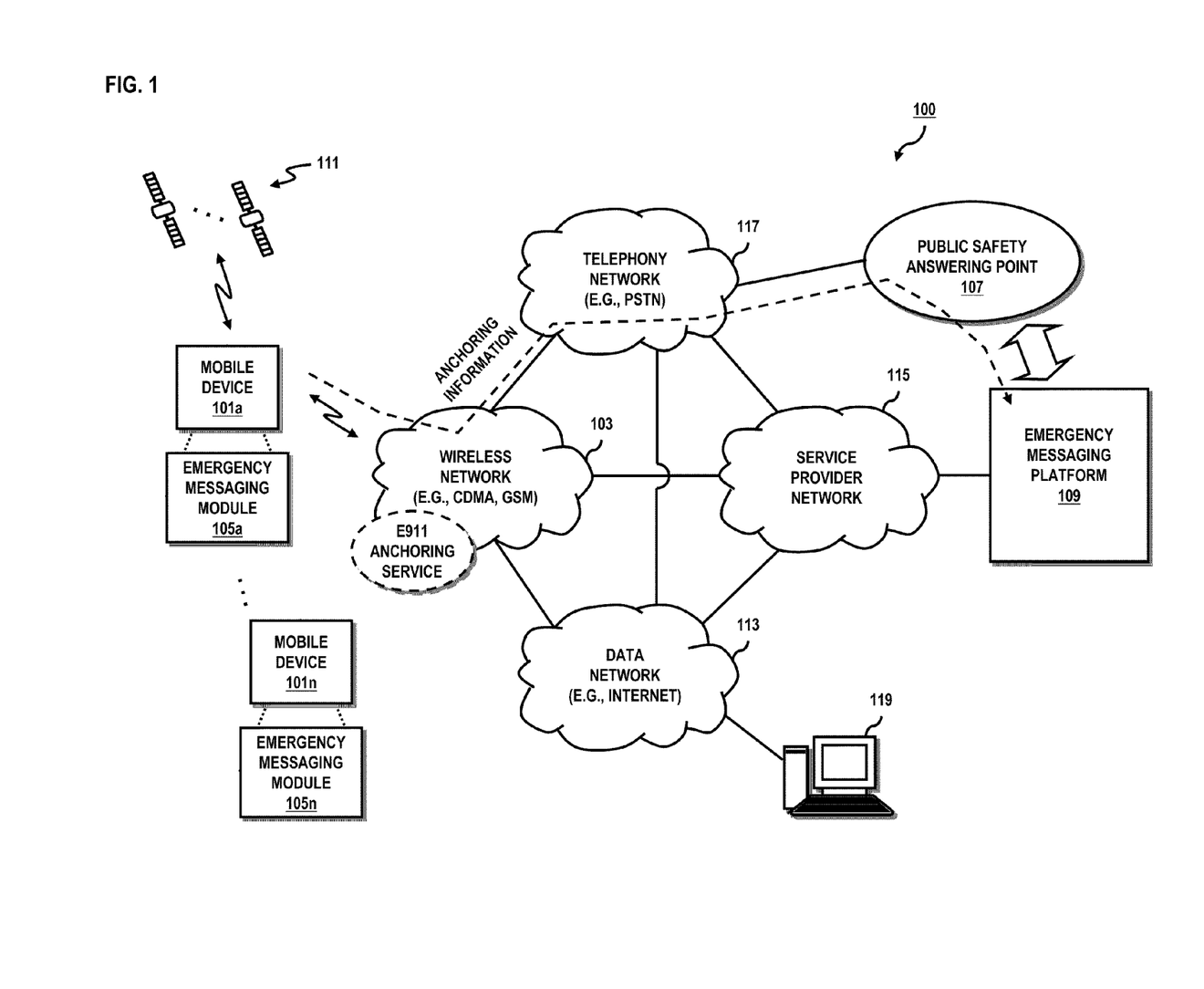
FIG. 1 is a diagram of a system capable of providing emergency text-based messaging according to an exemplary embodiment.

FIG. 1 is a diagram of a system capable of providing emergency text-based messaging according to an exemplary embodiment. Emergency calls, or 911 calls, are one example of a type of call that relies on the identification and location of the calling party to be determined in order to provide a service. Thus, while various embodiments are described herein in relation to emergency calls, the principles may also be utilized in any type of voice call that utilizes location and identification information about the calling party when providing a service. In system 100, one or more mobile devices 101a-101n are configured to communicate over a wireless network 103103 using voice sessions as well as other non-voice sessions, e.g., short messaging service (SMS), enhanced messaging service (EMS), multimedia messaging service (MMS), instant messaging (IM), etc. Mobile devices 101a-101n may be any cellular phone, radiophone, satellite phone, smart phone, wireless phone, or any other suitable mobile device, such as a personal digital assistant (PDA), pocket personal computer, tablet, customized hardware, etc.

Enhanced 911 (E911) service is a feature of the emergency call system that automatically associates a physical address with a calling party's Automatic Number Identification (ANI). In other words, the E911 service provides emergency responders with the location of the emergency without the calling party having to provide such information. The final location of the 911 operator handling the call is known as a Public Safety Answering Point (PSAP). Traditionally, PSAPs handle emergency voice calls without any capability to utilize other communication means. In general, the ANI information for a 911 caller is used to look up the address of the calling party in an Automatic Location Identification (ALI) database. For mobile devices, identifying the nearest PSAP for the caller can be enhanced by including geographical or spatial information (for determining local information) in the telephone call set-up as well. As shown in the example of FIG. 1, a constellation of global positioning system (GPS) satellites 111 can communicate with the mobile devices 101a-101n to provide such location information.

By way of example, one or more mobile devices 101a-101n may be configured to determine corresponding spatial positioning information through conventional satellite positioning system (SPS) technology, such as GPS technology; however, any suitable navigational or location determination technology may be utilized, such as advanced forward link trilateration (A-FLT), assisted-GPS (A-GPS), enhanced cellular identification (CELL-ID), wireless area network (WLAN) positioning, etc. SPS technology utilizes a constellation of satellites that transmit signals to receivers (not shown) of, for example, one or more mobile devices 101a-101n, so that the receivers may determine corresponding spatial positions (or locations), speeds, directions, and/or timing for mobile devices 101a-101n.

Public Safety Answering Point (PSAP) 107 operates in conjunction with an emergency messaging platform 109 to provide a hybrid capability. That is, the mobile devices 101a-101n can utilize, according to certain embodiments, a "hybrid" approach to obtaining emergency service by employing both a voice session and an SMS session. As shown, each of the mobile devices 101a-101n can utilize an emergency messaging module 105a-105n, respectively, that facilitates the concurrent communication sessions for the purposes of providing emergency services. This approach stems from the recognition that if the caller is unable to speak, is hearing-impaired, or otherwise wishes to communicate "quietly," then the caller must use additional, teletype equipment or software to be able to communicate with the operator at the PSAP 107.

In system 100, according to certain embodiments, one or more networks, such as data network 113, service provider network 115, telephony network 117, and/or wireless network 103, are provided to handle various communication sessions, voice communications as well as non-voice communications. Networks 103 and 113-117 may be any suitable wireline and/or wireless network. For example, telephony network 117 may include a circuit-switched network, such as the public switched telephone network (PSTN), an integrated services digital network (ISDN), a private branch exchange (PBX), or other like network.

Wireless network 103 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), long term evolution (LTE), satellite, and the like. Meanwhile, data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 103 and 113-117 may be completely or partially contained within one another, or may embody one or more of the aforementioned infrastructures. For instance, service provider network 115 may embody circuit-switched and/or packet-switched networks that include facilities to provide for transport of circuit-switched and/or packet-based communications. It is further contemplated that networks 103 and 113-117 may include components and facilities to provide for signaling and/or bearer communications between the various components or facilities of system 100. In this manner, networks 103 and 113-117 may embody or include portions of a signaling system 7 (SS7) network, or other suitable infrastructure to support control and signaling functions. As such, the conjunction of networks 103 and 113-117 may be adapted to facilitate the remote control and tracking services of system 100.

Under the scenario of FIG. 1, emergency messaging platform 109 is maintained by a service provider, and thus, can interact with the PSAP 107 via the service provider network 115. The PSAP 107, thus, may provide the capability for the caller to employ non-voice-based messaging service concurrent with the voice-based emergency call. While specific reference will be made hereto, it is contemplated that system 100 may embody many forms and include multiple and/or alternative components and facilities. In one embodiment, the platform 109 can be deployed as part of the PSAP 107.

Although the hybrid approach is described with respect to mobile devices 101a-101n, it is contemplated that this approach is applicable to any device capable of supporting a voice call and a non-voice form of communication—e.g., computing device 119. Computing device 119 may be any suitable computing device, such as a voice over internet protocol (VoIP) phone, skinny client control protocol (SCCP) phone, session initiation protocol (SIP) phone, IP phone, personal computer, softphone, workstation, terminal, server, etc.

As mentioned, one type of voice call in particular that a mobile device (e.g., mobile device 101a) may initiate involves an emergency call to a 911 operator within PSAP 107. For this purpose, the wireless network 103 may provide services and features that allow it to identify and locate the caller. In particular, the wireless network 103 includes an anchoring service that can identify the location of the caller and, based on that information, locate a local 911 operator to handle the call. Consequently, the anchoring service can route the call to the local 911 operator and provide the operator both the identity of the caller and the location of the caller. Any of the various anchoring services for wired, wireless, and voice over IP (VoIP) networks are contemplated.

Based on the determination of the local 911 operator, the wireless network 103 can communicate through telephony network 117 to the local Public Safety Answering Point 107. At the PSAP 107, operators have access to platform 109 that allows each operator to handle voice calls and non-voice messaging applications.

According to one embodiment, the platform 109 allows the 911 operator at the PSAP 107 to communicate with a caller utilizing either a voice call, a non-voice messaging method, or both. A 911 caller may for example, be hearing impaired, have speech difficulty, be having a medical emergency or be in a situation where it is not preferable to communicate by voice with the operator. The system 100 allows both voice and non-voice communication to handle such circumstances.

Figure 2A:
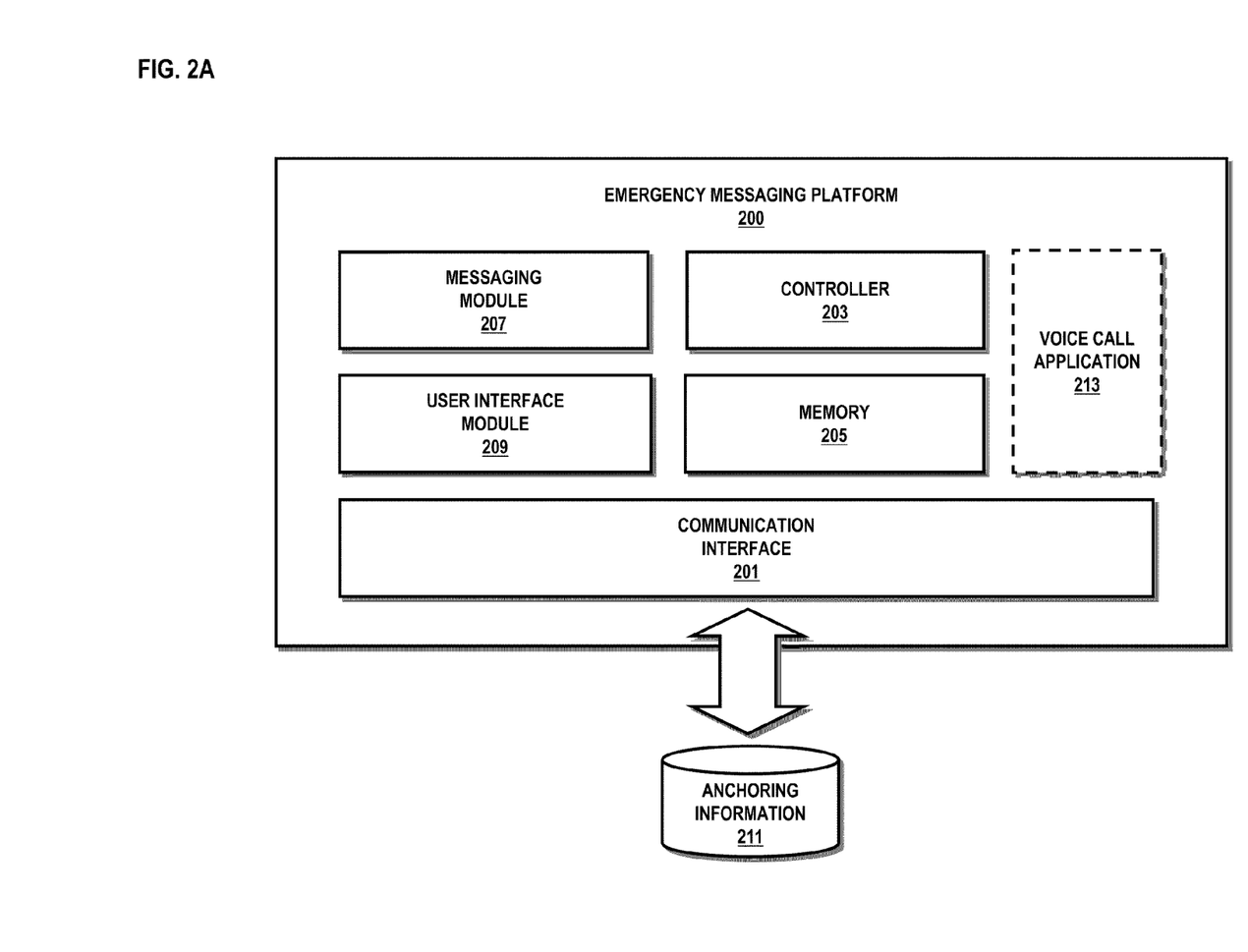
FIGS. 2A and 2B are, respectively, a diagram of an emergency messaging platform and a diagram of a user device capable of concurrently communicating over a voice channel and a messaging channel, according to various exemplary embodiments.
Figure 2B:
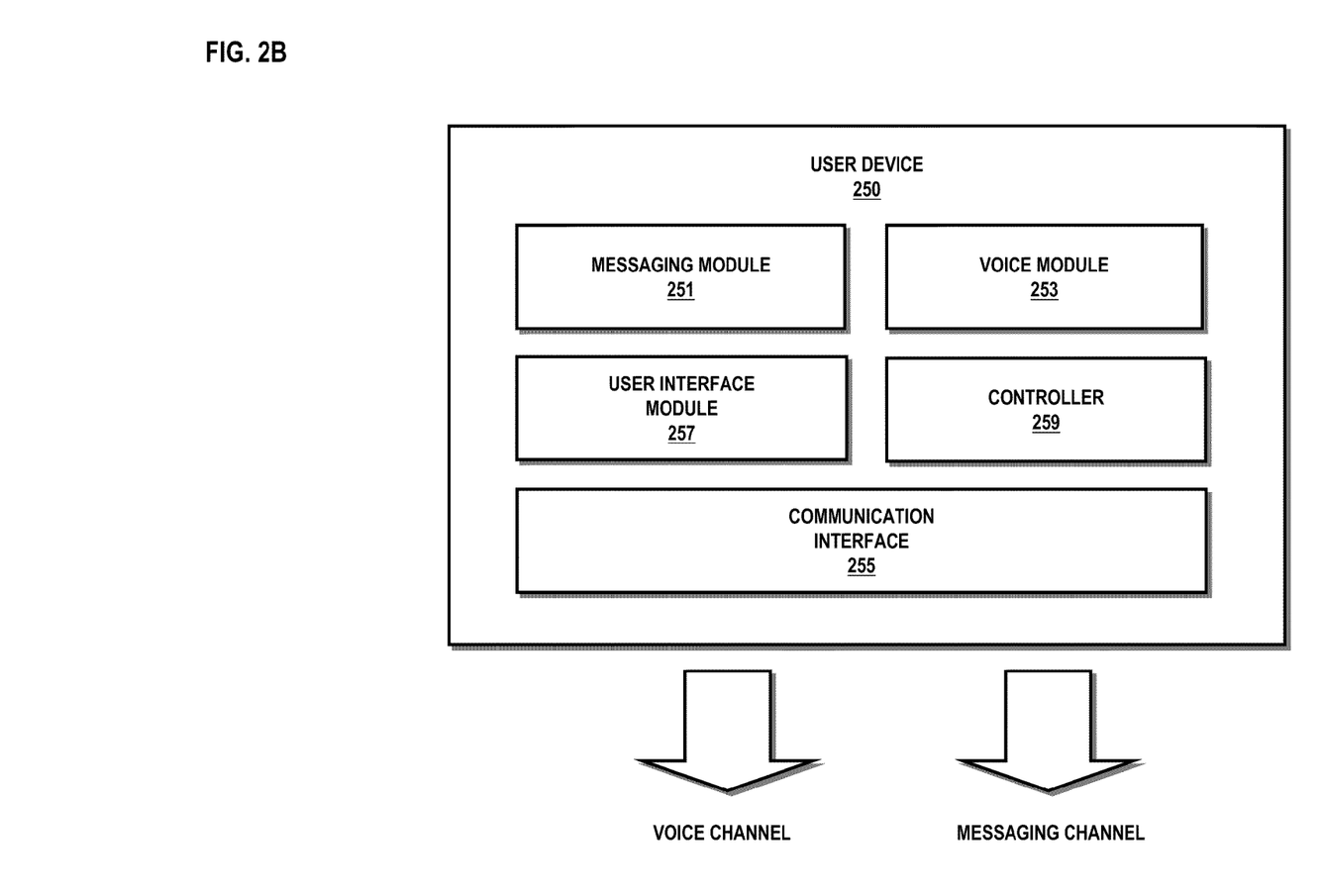

FIGS. 2A and 2B are, respectively, a diagram of an emergency messaging platform and a diagram of a user device capable of concurrently communicating over a voice channel and a messaging channel, according to various exemplary embodiments. As seen in FIG. 2A, emergency messaging platform 200 may comprise computing hardware (such as described with respect to FIG. 7), as well as include one or more components configured to execute the processes described herein for providing the emergency services of system 100. In one implementation, platform 200 includes communication interface 201, controller (or processor) 203, memory 205, messaging module 207, and user interface module 209. Platform 200 may also communicate with one or more repositories, such as an anchoring information database 211. Users may access platform 200 (or the features and functionality provided thereby) via devices 101a-101n, and 107. While specific reference will be made to this particular implementation, it is also contemplated that platform 200 may embody many forms and include multiple and/or alternative components. For example, it is contemplated that the components of platform 200 may be combined, located in separate structures, or separate locations.

According to one embodiment, platform 200 embodies one or more application servers accessible to 101a-101n, and 107 over one or more networks 103 and 113-117. Platform 200 may provide a user interface, e.g., web portal or other networked application, to permit user to access the features and functionality of platform 200 via devices 101a-101n and 119. According to certain embodiments, user interface module 209 may be configured via a web browser or other network-based application or system, such as a voice browser or interactive voice recognition system.

Messaging module 207 provide messaging services in support of emergency communications initiated by the devices 101a-101n. According to exemplary embodiments, messaging module 207 may be configured to generate control signals for transmission to device 101a utilizing any suitable bearer, such one or more call control setup messages, short messaging service (SMS) messages, enhanced messaging service (EMS) messages, multimedia messaging service (MMS) messages, electronic mail, files, or any other suitable bearer, as well as any suitable combination thereof. In particular implementations, these bearer mediums may include control signals in various forms, including attention (AT) commands, menu traversal paths, function codes, voice data, dual-tone multi-frequency (DTMF) signals, scripts, strings, parameters, object variables, and the like. It is noted that these control signals can be used in lieu of "software code," and therefore, may be directly integrated into the control logic of mobile device 101a, thereby requiring less processing and hence, less power. It is contemplated, however, that coded instructions may also be utilized.

Additionally, platform 200 may include one or more controllers (or processors) 203 for effectuating the aforementioned features and functionality of the emergency services of system 100, as well as one or more memories 205 for permanent and/or temporary storage of one or more of the aforementioned variables, parameters, information, signals, etc. In this manner, the features and functionalities of emergency messaging may be executed by controller(s) 203 and/or memories 205, such as in conjunction with one or more of the various components of platform 200.

In one embodiment, the platform 200 includes a voice call application 213, which allows an operator to communicate with a caller over a voice traffic channel. The voice call application 213 also has access to anchoring information database 211, which stores anchoring information received by the platform 200 as the call is routed to the platform 200. The anchoring information may, for example, include the identity and the location of the caller to assist in handling the emergency call.

The platform 200 also includes a text message module 207 that permits the operator to communicate using text messages, and/or other non-voice-based messages. Although the text message module 207 may be configured to communicate with the wireless network 103 to acquire the anchoring information, this information can be retrieved from the anchoring information database 211. The text message module 207 utilizes the anchoring information to aid in communicating with the caller using non-voice-based messages.

Figure 6:
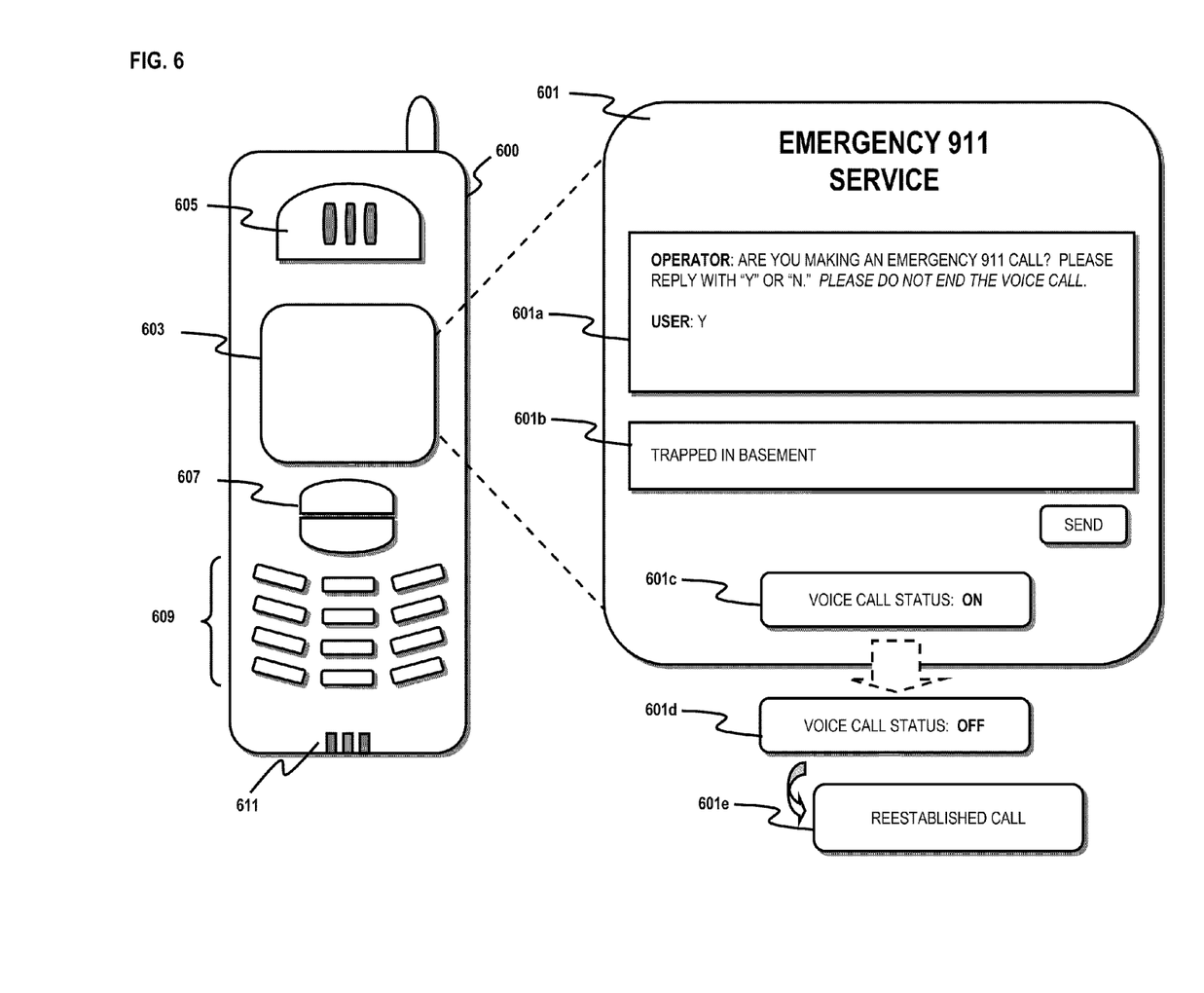
FIG. 6 is a diagram of a mobile device capable of using text messaging as part of an emergency service session, according to an exemplary embodiment.

On the user side, as shown in FIG. 2B, a user device 250, which may be a mobile device (e.g., mobile device 101a of FIG. 1) or a computer 119, includes a messaging module 251 that is configured to establish a text-based messaging session, as well as a voice module 253 configured to establish a voice-based call. Such voice-based call can be traditional plain-old-telephone service (POTS) calls or packetized voice calls (e.g., VoIP). These communication sessions can occur concurrently during an emergency call. It is noted that these communication sessions can be established over a circuit-switched network, a packet-switch network, or a combination thereof. Thus, communication interface 255 can be appropriately configured depending on the transport systems and networks. Although only a single interface 255 is shown, it is noted that multiple communication interfaces may be utilized, depending on the technologies involved. Moreover, the user device 250 employs a user interface module 257 to enable control by the user of the device of these various communication sessions; in one embodiment, the user interface module 257 provides a graphical user interface (GUI) as shown in FIG. 6. Additionally, a controller 259 is configured to coordinate the concurrent communication sessions provided by the messaging module 251 and voice module 253; for example, the controller 259 generates the appropriate signaling to control the communication interface 255 for transmissions over the voice channel and the messaging channel.

Figure 3:
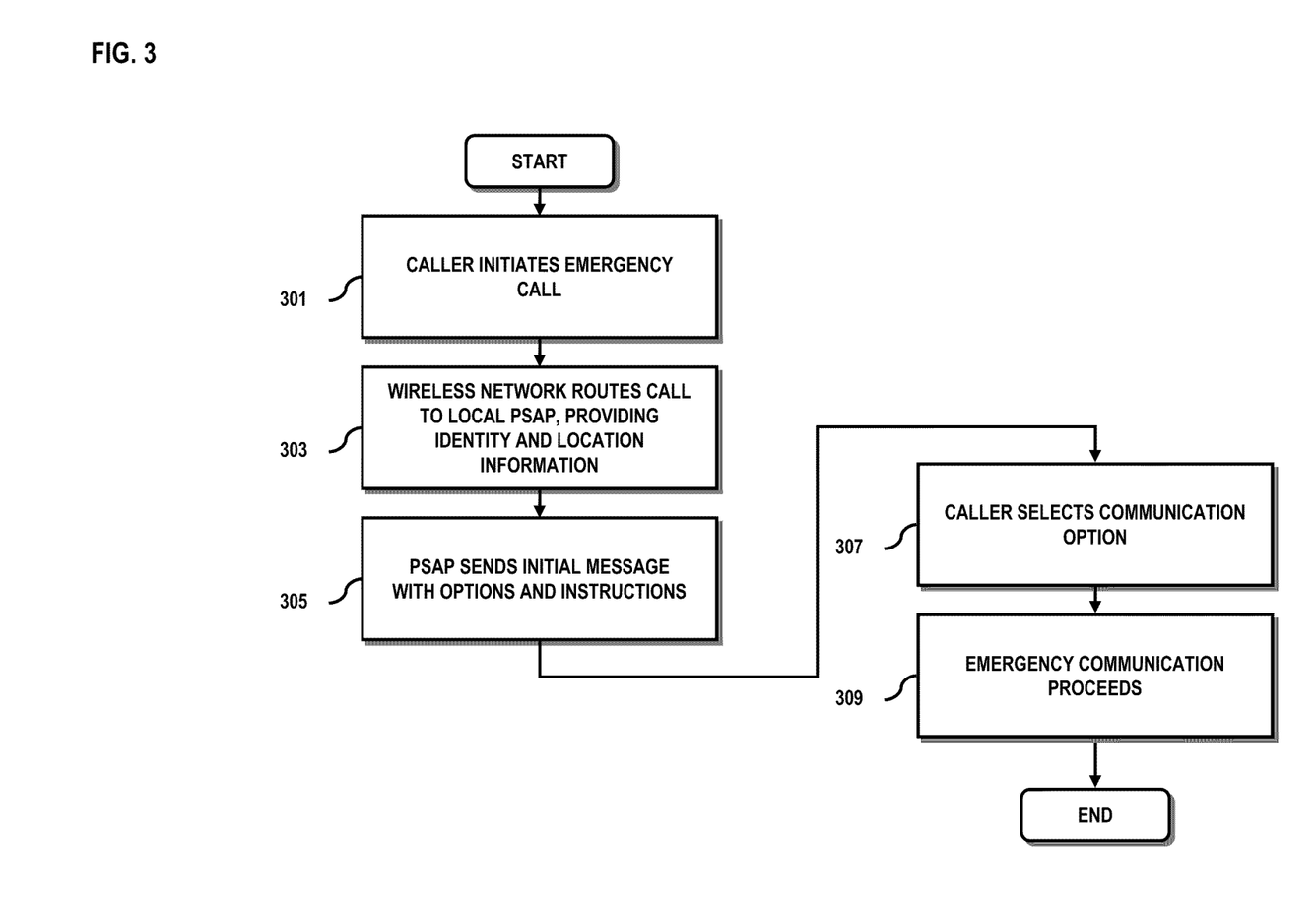
FIG. 3 is a flowchart of processes for supporting text-based messaging according to an exemplary embodiment.

FIG. 3 is a flowchart of processes for supporting text-based messaging according to an exemplary embodiment. Initially, in step 301, a caller, using one of the mobile devices 101a-101n, places an emergency voice call (e.g., 911 call) over the wireless network 103. In step 303, the wireless network 103 routes the emergency voice call to the PSAP 107 that is, for example, nearest the caller (denoted as the "local PSAP"). As part of this routing, the wireless network 103 identifies the caller and location, determines the local PSAP (which in this example is PSAP 107), and then routes the call along with anchoring information to the PSAP 107.

By way of example, at the PSAP 107, an automated message may be provided to the caller via an interactive voice response (IVR) unit (not shown): "Press 1 for text messaging, press 2 to speak to the operator, or hold on the line for the operator." If the caller presses "1", then the PSAP 107 can initiate a text messaging service provided by the platform 109, which generates and transmits an introductory text message to the caller. According to certain embodiments, by having the caller first utilize a voice call for the emergency service, the wireless network 103 can utilize the existing services, e.g., E911 anchoring service, to locate the user. Additionally, the SMS delivery time is enhanced as the mobile device (e.g., 101a) is already on a traffic channel, and thus, negates the need to page the mobile device.

As noted, mobile devices 101a-101n each contain an emergency messaging module 105a-105n to facilitate sending and receiving emergency messages between the devices 101 and PSAP 107. The emergency messaging modules 105a-105n enable the transmission of non-voice messages between the mobile devices 101a-101n and the PSAP 107. As discussed above, there are certain emergency situations where a user may not prefer to make a voice call for assistance and must rely on non-voice communications such short message service (SMS), multimedia messaging service (MMS), instant messaging (IM), and electronic mail. In this manner, the emergency messaging feature can be an end-to-end service, in which protocols are executed at the devices 101a-101n by the emergency messaging modules 105a-105n and at the PSAP 107 by the platform 109.

Typically, a text message is associated with a "To:" field, or the like, to specify addressing information of a recipient, and a "From:" field to indicate the source. In generating the text message, the emergency platform 109 via messaging module 207 can fill in this "To:" address using the anchoring information provided with the initial voice call. Also, the messaging module 207 can fill in the "From:" address using a predetermined address (e.g., as to notify the recipient that this is part of an emergency service). For example, the address may be of a form similar to "Operator34@PSAP.ca.gov". In this way, any reply message can be quickly routed and delivered to a specific PSAP and a specific operator. Other forms and types of addresses may be utilized depending on the text messaging application being utilized.

In one embodiment, the initial text message (as initiated by the PSAP 107) may provide further instructions to the caller. By having the PSAP 107 send the first SMS to the E911 user with a routable address, the wireless network 103 does not have to guess where and how to route an SMS message to a generic short code 911, for example; or whether any local PSAP already have developed the capability to support the messaging service.

The message, for example, may ask the caller to confirm they are making an emergency 911 "call" and then tell them not to terminate the voice call. Also messages can be sent to instruct the caller to drop the voice call if it is determined that a true emergency does not exist so as to free up the voice channels. Other instructional messages may include sending a prompt to the caller to re-initiate the voice call if a location update is needed or if the voice call is inadvertently dropped.

In response to receiving the emergency call, the PSAP 107 may send a automatic message to the caller, in step 305, prompting the caller on how to proceed. For example, the PSAP 107, via an IVR, may prompt the caller over the voice call to select the following options, e.g.: "Press 1 for Speak to the Operator" or "Press 2 to Use Text Messaging". According to one embodiment, the default operation may be for the PSAP 107 to automatically initiate a voice-based connection if no selection is received from the caller after a predetermined time period (e.g., about 5 seconds). In step 307, the caller selects an option to proceed either using voice-based communication or non-voice-based communication; in this manner, the PSAP 107 communicates using the selected communication option. Accordingly, the PSAP 107 operates in conjunction with the emergency messaging platform 200 to provide the messaging option; in addition, the platform 200 may itself control the voice call with using the voice call application 213. In step 309, the caller and the PSAP 107 communicate per the caller's selection until the emergency is satisfactorily addressed.

One benefit of the process described with respect to FIG. 2 is that the anchoring services already in place for handling emergency voice calls may be utilized to provide the needed information for communicating with the caller using non-voice message applications, such as email, IM, SMS, and MMS. Also, PSAP 107 can use the commonly available solution such as a short code (if for example, the PSAP 107s want to go through an aggregator to a wireless operator), or email address (if a public data network, e.g., Internet, is preferred). That is, if short code is used, the text messages could be made free-of-charge to the 911 user; however, using short code requires the message to go through an aggregator to reach the wireless network 103.

Figure 4:
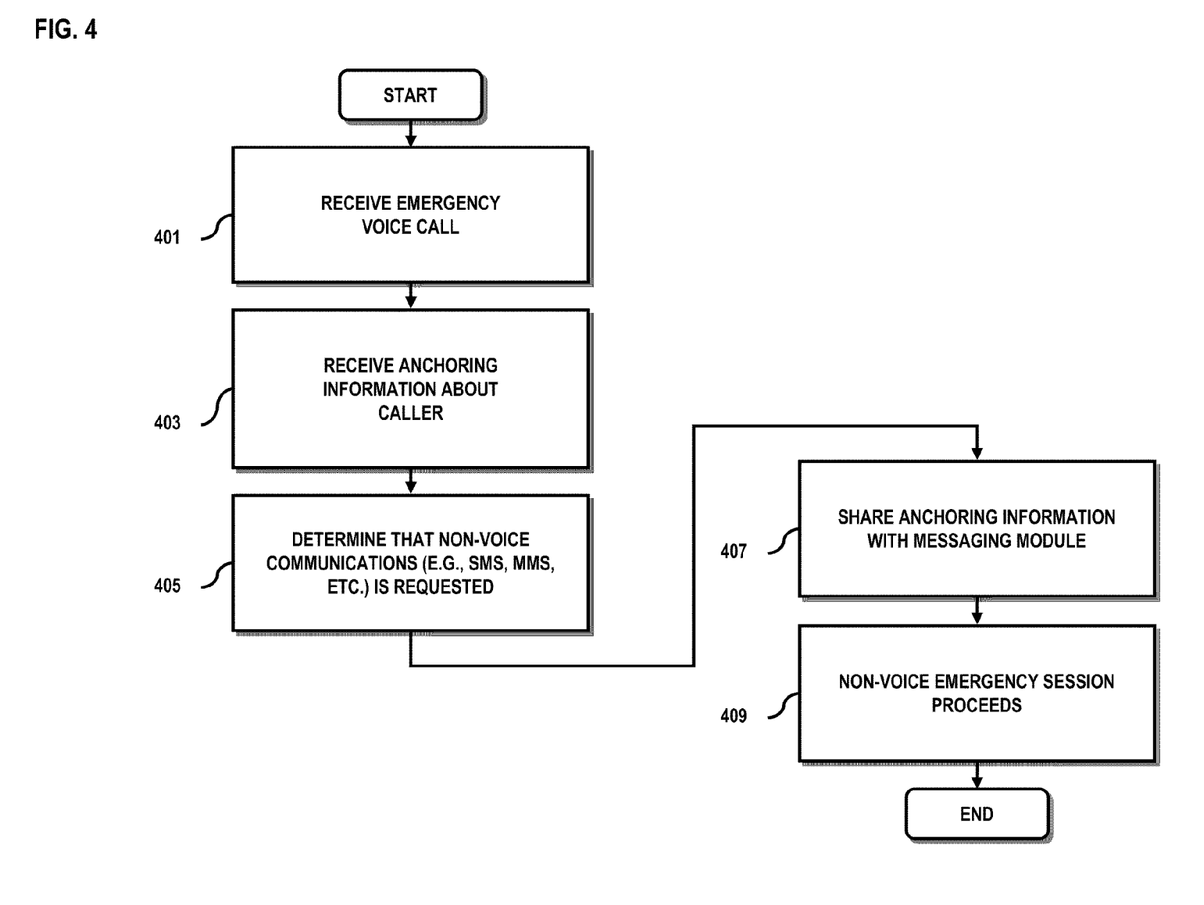
FIG. 4 is a flowchart of a process for a Public Safety Answering Point to support text-based emergency messaging, according to an exemplary embodiment.

FIG. 4 is a flowchart of a process for a Public Safety Answering Point to support text-based emergency messaging, according to an exemplary embodiment. For the purposes of illustration, the process is described with respect to the emergency message platform 109 operating in conjunction with the PSAP 107 (but as a separate entity). However, it is contemplated that the emergency messaging platform 109 can reside within the PSAP 107, or otherwise integrated. In step 401, an emergency call is received at the PSAP 107 and; or by the voice call application 213, if the platform 200 is so configured. As described in more detail below, the PSAP 107 allows an operator to handle the voice-based 911 call as presently performed. As part of handling such a call, the PSAP 107 receives anchoring information, in step 403, about the caller (i.e., obtained from the concurrent voice-based emergency call). For example, typical anchoring information relates to the caller identity such as the ANI information for that calling number and the caller's geographic location which can be provided through GPS information or other services within the wireless network. This anchoring information can then be supplied to the emergency messaging platform 109.

Typically, at this point, the operator would respond to the incoming voice call by opening a voice communication channel and talking with the caller. However, the caller, as described above, may not prefer to have a voice-based session with the operator. Thus, in step 405, a determination is made whether or not the caller desires a voice-based session or a non-voice-based session. If a voice-based session is desired, then the anchoring information is already available and the voice call proceeds. If, however, a non-voice session is desired, then the voice platform shares the anchoring information, in step 407, with messaging module 207, which may provide one or more messaging services, e.g., email, IM, MMS, SMS, and the like. Sharing of the anchoring information may be accomplished by the operator manually entering the information within the messaging module 207 or by automatic messaging passing (or signaling) between the PSAP 107 and the messaging module 207 of emergency messaging platform 109. In step 409, the non-voice emergency session is established, so that the caller can communicate with the operator using one of the various messaging services supported by the messaging module 207.

Figure 5:
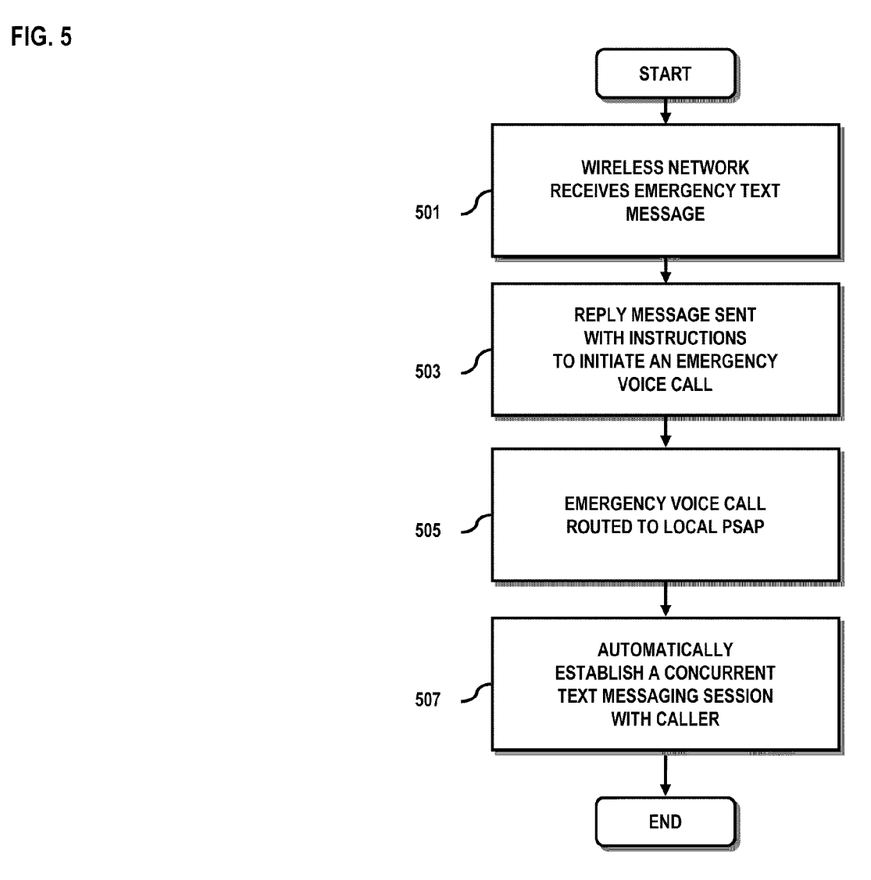
FIG. 5 is a flowchart of a process for routing a text-based emergency message initiation, according to an exemplary embodiment.

FIG. 5 is a flowchart of a process for routing a text-based emergency message initiation, according to an exemplary embodiment. By way of example, this process is described with respect to text messaging (e.g., SMS), it is contemplated that other messaging services can be utilized. While it may be useful to allow an emergency call to be initiated by a caller sending a text message to "911", there are benefits to having the 911 call be a voice call—e.g., the operator can listen in on the activities surrounding the caller. Thus, even though text-based, or non-voice-based, emergency messages are contemplated, it can be beneficial for the initial communication to be via a voice traffic channel. According to the flowchart of FIG. 5, if a text-message 911 call is initiated by a mobile device (e.g., mobile device 101a) and received by a messaging gateway (not shown) of the wireless network 103, in step 501, then the gateway can be configured to send a reply. In particular, the network 103 can send a text message, in step 503, that includes instructions for initiating a 911 voice call. Such instructions can be concise, but of sufficient length to convey that the caller initiate a voice call by dialing the digits "911." Then, in step 505, when the voice call is initiated, the call is routed to the local PSAP 107 with the anchoring information of the caller.

Optionally, after establishment of the emergency voice session with the mobile device 101a, the messaging platform 109, in communication with the PSAP 107, can automatically establish text messaging session with the device 101a, per step 507.

FIG. 6 is a diagram of a mobile device capable of using text messaging as part of an emergency service session, according to an exemplary embodiment. In this example, a user may employ mobile device 600 to submit an emergency call, whereby a non-voice session is established as part of the emergency service. For illustrative purposes, mobile device 600 is described with respect to a mobile phone, such as a cellular phone, configured to provide a GUI 601 to users via display 603.

GUI 601 includes a text box 601a that illustrates the messages between the user and the operator of the PSAP 107. In this example, the operator confirms whether the emergency text messaging session is intended, and to remain on the voice channel: "Are you making an emergency 911 call? Please reply to this message with 'Y' or 'N.' Please do not end the voice call." As shown, the user enters a response of "Y" to indicate that the emergency service is intentionally invoked. Another textbox 601b is designated for input by the user. Under this example, the user is trapped in the basement of the user's home, either inadvertently or deliberately because the user is seeking a place of safety, for instance, from intruders. Hence, the user can type "trapped in basement" in the textbox 601b. The ability to remain "silent" permits the user to stay of out of potential danger—i.e., detection by the intruders. In one embodiment, a status box or bar 601c can be displayed to alert the user if the voice call is somehow dropped. If the status were "OFF" as seen in status box 601d, this indication can be tied to a series of other options and menus to the user (e.g., box 601e), so that the user may automatically reestablish the voice communication without having to speak. Under such a scenario, the operator can be automatically notified that the voice call has been terminated, and that the caller will attempt to another voice call. In this manner the PSAP 107 and platform 109 would not treat the incoming call as a new call.

In this example, mobile phone 600 includes one or more transducers (e.g., speakers) 605 to output audible signals to the user. Cursor buttons 607, keypad 609, and microphone 611 enable users to interact with GUI 601 of display 603. As such, mobile device 600 is, in exemplary embodiments, also capable of speech synthesis and voice recognition. Moreover, the display 603 can be a touch-screen, such that controllers and buttons can be readily activated; for example, the reestablish call box 601e can be a button that activates the reestablishment of the call upon selection.

The described processes, according to certain embodiments, provide a number of benefits. One benefit is that the existing methods and techniques for identifying and locating a 911 caller may be utilized as well as the existing methods for providing that information to a local PSAP. Because the mobile device will already have a voice channel open, the speed of sending and receiving a text message is improved. Also, there is no need to change a portion of the network or a mobile device. Further, any mobile device with text message capabilities can communicate with a PSAP offering a non-voice based message system. In addition, the voice call and the text message session can occur in parallel so that the PSAP may monitor both the background noise and sounds of the voice call as well as the specific text messages being sent and received; such enhanced communications can contribute to resolution of the emergency situation.

The processes described herein for providing emergency messaging may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
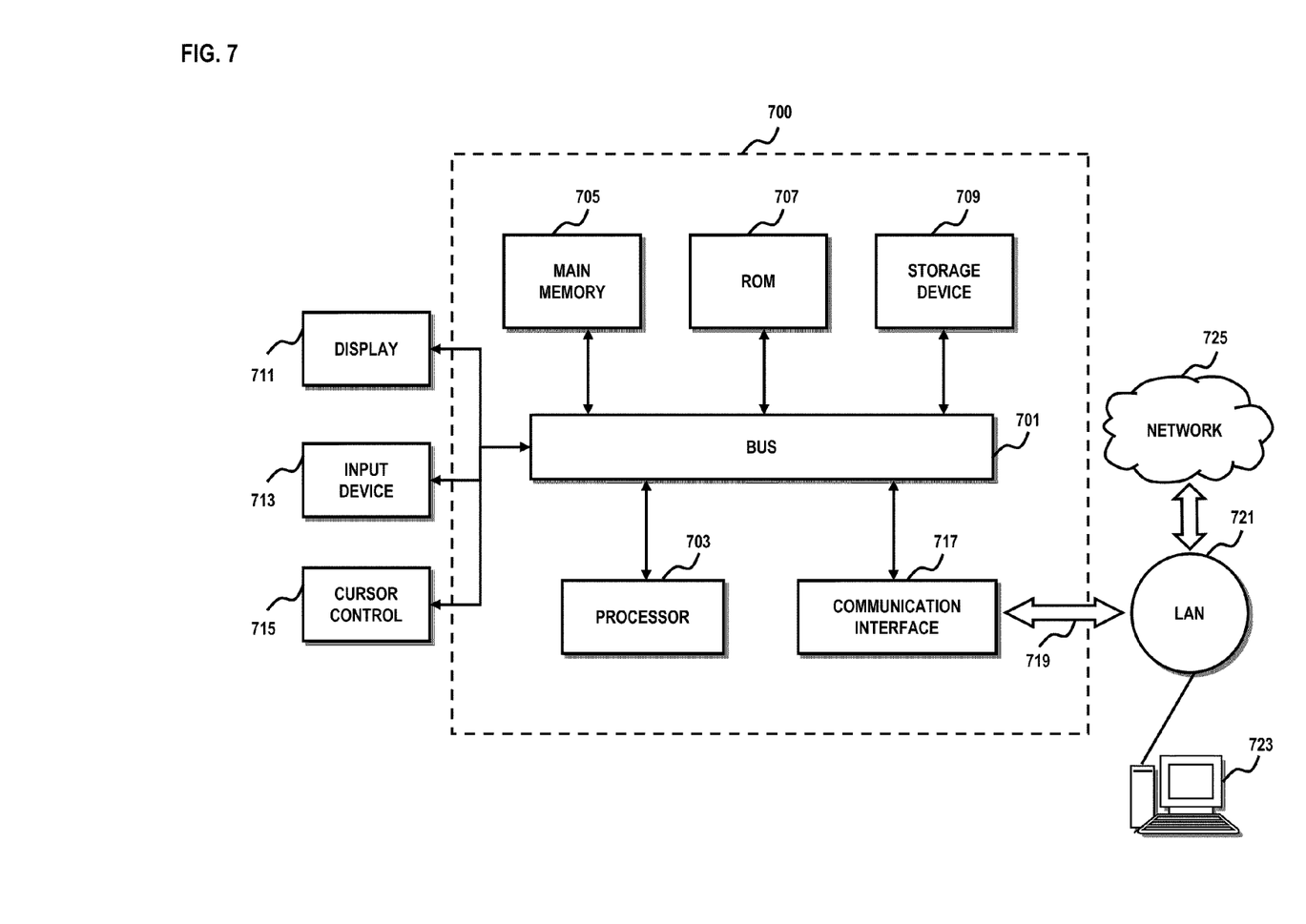
FIG. 7 is a diagram of a computer system that can be used to implement various exemplary embodiments.

FIG. 7 illustrates computing hardware (e.g., computer system) upon which these embodiments can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 6, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving a voice-based call from a mobile device;
   receiving anchoring information about the voice-based call;
   initiating an inquiry to the mobile device related to whether communicating via a non-voice-based messaging session is desired by a user of the mobile device; and
   selectively initiating a non-voice-based messaging session related to the voice-based call to communicate with the mobile device using the anchoring information;
   receiving an indicator from the mobile device that communicating via the non-voice-based messaging session is desired, wherein the voice-based call and the non-voice-based messaging session are concurrently utilized;
   determining whether the voice-based call is an emergency call;
   initiating release of the voice-based call when the voice-based call is not an emergency call; and
   maintaining the non-voice-based messaging session.

2. A method of claim 1, wherein the voice-based call is an emergency call.

3. A method of claim 1, wherein the anchoring information includes an identification of the mobile device and a location of the mobile device.

4. A method of claim 3, wherein the anchoring information is provided by a wireless communication network serving the mobile device.

5. A method of claim 1, wherein the non-voice-based messaging session utilizes messages relating to an electronic mail, an instant messaging (IM) message, a short message service (SMS) message, or a multimedia messaging service (MMS) message.

6. An apparatus comprising:
   a communication interface configured to receive a voice-based call from a mobile device; and
   a processor configured to receive anchoring information about the voice-based call, initiate an inquiry to the mobile device related to whether communicating via a non-voice-based messaging session is desired by a user of the mobile device, and to selectively initiate the non voice-based messaging session related to the voice-based call, when desired, to communicate with the mobile device using the anchoring information, wherein the communication interface is further configured to receive an indicator from the mobile device by the voice-based call that communicating via the non-voice-based messaging session is desired, wherein the voice-based call and the non-voice-based messaging session are concurrently utilized, and wherein the processor is further configured to determine whether the voice-based call is an emergency call, to initiate release of the voice-based call when the voice-based call is not an emergency call, and to maintain the non-voice-based messaging session.

7. An apparatus of claim 6, wherein the voice-based call is an emergency call.

8. An apparatus of claim 6, wherein the anchoring information includes an identification of the mobile device and a location of the mobile device.

9. An apparatus of claim 8, wherein the anchoring information is provided by a wireless communication network serving the mobile device.

10. An apparatus of claim 6, wherein the non-voice-based messaging session utilizes messages relating to an electronic mail, an instant messaging (IM) message, a short message service (SMS) message, or a multimedia messaging service (MMS) message.

11. A method comprising:
    determining anchoring information associated with an emergency voice call placed by a mobile device associated with a user;
    determining a public safety answering point designated for serving the mobile device;
    initiating establishment of the emergency voice call between the mobile device and the public safety answering point to permit communication between the user and an operator of the public safety answering point;
    initiating an inquiry to the mobile device related to whether communicating via a non-voice-based messaging session is desired by the user; and initiating establishment of the non-voice-based messaging session, based on the anchoring information, between a messaging platform coupled to the public safety answering point and the mobile device to permit communication between the operator and the user when communicating via a non-voice-based messaging session is desired; and terminating the emergency voice call, while maintaining the non-voice-based messaging session.

12. A method of claim 11, wherein the anchoring information includes an identification of the mobile device and a location of the mobile device.

13. A method of claim 11, wherein the non-voice-based messaging session utilizes messages relating to an electronic mail, an instant messaging (IM) message, a short message service (SMS) message, or a multimedia messaging service (MMS) message.

* * * * *